United States Patent [19]

Womble

[11] Patent Number: 4,753,724

[45] Date of Patent: Jun. 28, 1988

[54] BYPASS OIL REFINING DEVICE FOR INTERNAL COMBUSTION ENGINES

[76] Inventor: Eugene W. Womble, 105 S. Plantation Pl., Anaheim, Calif. 92806

[21] Appl. No.: 921,628

[22] Filed: Oct. 20, 1986

[51] Int. Cl.$^4$ .............................................. B01D 35/18
[52] U.S. Cl. .................................... 210/180; 210/184; 210/243; 210/418; 219/275; 123/549
[58] Field of Search ............... 210/130, 180, 184, 243, 210/416.4, 416.5, 418, DIG. 13, DIG. 17; 219/205, 206, 207, 272, 273, 275; 123/549, 557, 196 AB; 196/121

[56] References Cited

U.S. PATENT DOCUMENTS

| | | | |
|---|---|---|---|
| 1,739,818 | 12/1929 | Beals | 219/207 |
| 3,873,806 | 3/1975 | Schosson | 219/275 |
| 4,006,084 | 2/1977 | Priest | 210/184 |
| 4,146,475 | 3/1979 | Forsland | 210/184 |
| 4,349,438 | 9/1982 | Sims | 210/180 |
| 4,369,110 | 1/1983 | Picek | 210/180 |
| 4,388,185 | 6/1983 | Ott et al. | 210/184 |
| 4,443,334 | 4/1984 | Shugarman et al. | 210/184 |
| 4,575,422 | 3/1986 | Zimmer | 210/130 |

Primary Examiner—Richard V. Fisher
Assistant Examiner—Richard D. Jordan
Attorney, Agent, or Firm—Klein & Szekeres

[57] ABSTRACT

A coating of tetrafluoroethylene or other suitable material is present in the heating element of a bypass oil refining device for the purpose of substantially preventing deposit of carbon or carbonaceous material on the heating element during operation of the device. The heating element is located in a vaporization chamber. The bypass oil refining device incorporates a pressure control valve to shut off flow of oil from a mechanical filter to the vaporization chamber when the oil pressure in the mechanical filter exceeds a predetermined value. An externally adjustable flow control valve is also incorporated in the device to permit control of the rate of flow of the oil from the mechanical filter to the vaporization chamber. Water and fuel vapors which are distilled out of the oil in the vaporization chamber are released from the vaporization chamber through a vent and check valve, and are absorbed as condensates in a suitable, absorbent material. The absorbent is preferably placed into a disposable cartridge.

9 Claims, 2 Drawing Sheets

BYPASS OIL REFINING DEVICE FOR INTERNAL COMBUSTION ENGINES

BACKGROUND OF THE INVENTION

1. Field of the Invention

The present invention is directed to improvements in bypass oil refining devices of the type which are connected to internal combustion engines. More particularly, the present invention is directed to a bypass oil refining device which has improved performance characteristics regarding the flow of engine oil through the device and regarding the operation of a heating element which distills water and volatile fuel vapors out of the oil.

2. Brief Description of the Prior Art

Bypass oil refining devices for internal combustion engines have been known in the art for a long time. More particularly, bypass oil refining devices of the type to which the present invention pertains are often incorporated as "add-on devices" in automobiles and trucks. The principal function of such bypass oil refining devices is to remove volatile liquid contaminants, such as water and fuel (gasoline or diesel fuel) from the engine oil. This is a function which is not at all performed by the conventional oil filters included in virtually all internal combustion engine driven vehicles.

In addition to a heating mechanism which causes water and fuel vapors to distill out of the engine oil, the bypass oil refining devices usually also incorporate a substantially conventional oil filter to remove solid particles from the oil. In this respect the bypass oil refining devices provide an additional oil filter to supplement the particle and sludge removing action of the conventional oil filter of the vehicle.

In order to accomplish the above-summarized functions, the bypass oil refining devices are fluidly connected to the crankcase or oil line of the engine at a point where oil pressure is relatively large. The oil continuously flows from the crankcase into the bypass device. From the bypass oil refining device the purified oil returns to the crankcase through another fluid line. Thus, in accordance with the prior art, bypass oil refining devices have a mechanical filtering medium (such as a disposable filter cartridge containing cotton waste and excelsior), and a heating element for rapidly heating the oil to sufficiently high temperature so as to boil out, as vapors, a substantial amount of the water and fuel contaminants of the oil.

A specific embodiment of a bypass oil refining device of the above-summarized type is described in U.S. Pat. No. 4,349,438. In the device of this prior art patent the mechanical filter cartridge is separated from a vaporization chamber by a vaporization plate which has only a single narrow conduit or nozzle to permit flow of oil from the filter cartridge into the vaporization chamber. An electrical heating element is disposed in the vaporization chamber and is energized by the battery of the car or truck (or boat or the like) which is driven by the internal combustion engine. Water and fuel vapors, which are distilled out of the oil in the vaporization chamber, are released into the environment through a vent having a check valve. Oil is supplied to the device under pressure by a line connecting an oil inlet of the device with a "high pressure" point in the vehicle's oil system or crankcase.

Principal disadvantages of the above-summarized prior art bypass oil refining devices include the following. Carbonaceous material forms relatively rapidly during operation of the device and it deposits on the surface of the heating element. The carbon or carbon-like deposit on the heating element insulates it from the oil, and thereby reduces its effectiveness to transfer heat to the oil. In some extreme situations the ability of the heating element to transfer heat may be reduced by the deposited carbon to such extent that water and fuel vapors are no longer effectively distilled out of the oil in the vaporization chamber.

Another disadvantage of the device described in U.S. Pat. No. 4,349,438 is that as the vehicle moves, especially on a rough road, the liquid oil accumulated in the vaporization chamber is subjected to a surging and slushing action. When the oil covers the nozzle leading from the mechanical filter cartridge to the vaporization chamber (due to the undulating, surging, or slushing action caused by movement of the vehicle), then there is no longer a narrow stream of oil coming into direct contact with the heating element. Consequently, effectiveness of heating, and distillation of oil and fuel vapors from the oil in the vaporization chamber is diminished.

Still further, under certain operating conditions the oil pressure in the crankcase is sufficiently high so as to result in undesirably high flow rate through the bypass refining device, and in undesirably high oil pressure in the vaporization chamber. When the vaporization chamber becomes filled with oil, excess oil may be released into the environment through the vent and check valve. Loss of engine oil in this manner is, of course, highly undesirable.

Even during normal operation of the bypass oil refining device (when the vent and check valve of the prior art bypass oil refining devices function properly and release only water and fuel vapors) the release of water and particulary fuel vapors into the environment is undesirable for environmental reasons.

In light of the foregoing, there exists a need in the prior art for an improved bypass oil refining device for internal combustion engines, primarily for trucks and automobiles, which overcomes the above-summarized disadvantages of the prior art. The present invention provides such an improved bypass oil refining device.

SUMMARY OF THE INVENTION

It is an object of the present invention to provide a bypass oil refining device for internal combustion engines, primarily of trucks and automobiles, which has a heating element substantially protected against deposit of carbonaceous material.

It is another object of the present invention to provide a bypass oil refining device for internal combustion engines, primarily of trucks and automobiles, wherein nozzles directing a thin stream of oil flow to a heating element in a vaporization chamber are substantially protected against surging and slushing action of an oil level established in the chamber.

It is still another object of the present invention to provide a bypass oil refining device for internal combustion engines, primarily of trucks and automobiles, wherein flow of oil through the device is shut off when the oil pressure exceeds a predetermined value.

It is yet another object of the present invention to provide a bypass oil refining device for internal combustion engines, primarily of trucks and automobiles, wherein the flow rate of oil through the device is regulated by an externally adjustable valve.

It is a further object of the present invention to provide a bypass oil refining device for internal combustion engines, primarily of trucks and automobiles, wherein water and fuel vapors distilled out of the engine oil by the device are safely absorbed in a disposable container and are not released into the environment.

The foregoing and other objects and advantages are attained by improvements in the bypass oil refining device which has an inlet for receiving engine oil flowing from the crankcase into the device, a mechanical filter for filtering the oil passing through the device, a vaporization chamber into which the oil flows through one or more nozzles from the mechanical filter, a heating element disposed in the vaporization chamber to rapidly heat the oil, an outlet vent for releasing water and fuel vapors which are distilled out of the oil by heating, and a return flow line to return oil to the crankcase.

In accordance with the present invention a suitable coating, such as a polytetrafluoroethylene (TEFLON) coating is disposed on the exterior surface of the heating element whereby the deposit and build-up of carbonaceous material on the surface of the heating element is substantially prevented. A plurality of baffle plates are disposed on a plate which separates the vaporization chamber from the mechanical filter, whereby surging and slushing action of the oil in the vaporization chamber is substantially reduced. This, in turn, substantially eliminates situations where the oil passing through the nozzles "bubbles" through a layer of oil in the chamber, rather than being directed in thin streams toward the heating element.

Still in accordance with the improvements of the present invention, a pressure control valve is incorporated between the mechanical filter and the vaporization chamber to shut off the flow of oil through the nozzles into the chamber when the oil pressure exceeds a predetermined value. This feature prevents undesirable situations where oil is released from the bypass oil refining device through the vapor release vent.

Another adjustable flow control valve, preferably a needle valve, is incorporated in the device to adjustably regulate the flow rate of oil from the mechanical filter to the vaporization chamber.

As still another improvement, the vapor release vent of the bypass oil refining device is fluidly connected with absorbent material disposed in a suitable container, so as to absorb the water and fuel vapors distilled out of the engine oil by the bypass oil refining device. The purpose of this feature is to prevent escape of the noxious fuel vapors into the environment.

The features of the present invention can be best understood, together with further objects and advantages, by reference to the following description, taken in connection with the accompanying drawings, wherein like numerals indicate like parts.

DESCRIPTION OF THE PREFERRED EMBODIMENT

Figure 1:
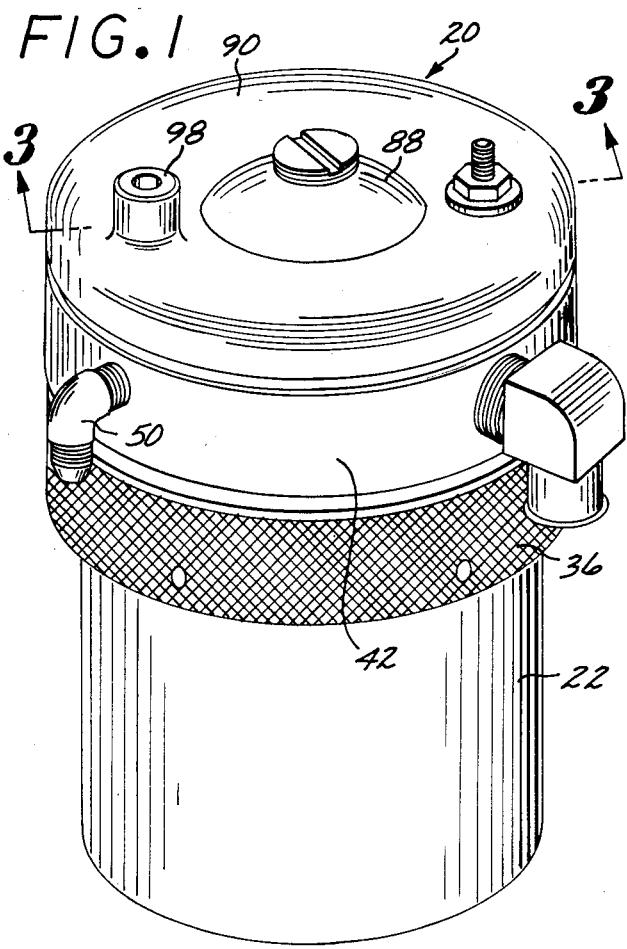
FIG. 1 is a perspective view of the improved bypass oil refining device of the present invention.

The following specification taken in conjunction with the drawings sets forth the preferred embodiment of the present invention. The embodiment of the invention disclosed herein is the mode contemplated by the inventor for carrying out his invention in a commercial environment, although it should be understood that various modifications can be accomplished within the parameters of the present invention.

Referring now to the drawing Figures, the preferred embodiment 20 of the improved bypass oil refining device of the present invention is disclosed. The bypass oil refining device 20 of the present invention is in many respects similar in construction to the device described in U.S. Pat. No. 4,349,438. Therefore, those features and functions of the improved bypass oil refining device 20 of the present invention, which are described in detail in U.S. Pat. No. 4,349,438, will be described here only to the extent necessary to explain and emphasize the present novel features and invention. The specification of U.S. Pat. No. 4,349,438 is hereby expressly incorporated by reference.

Figure 3:
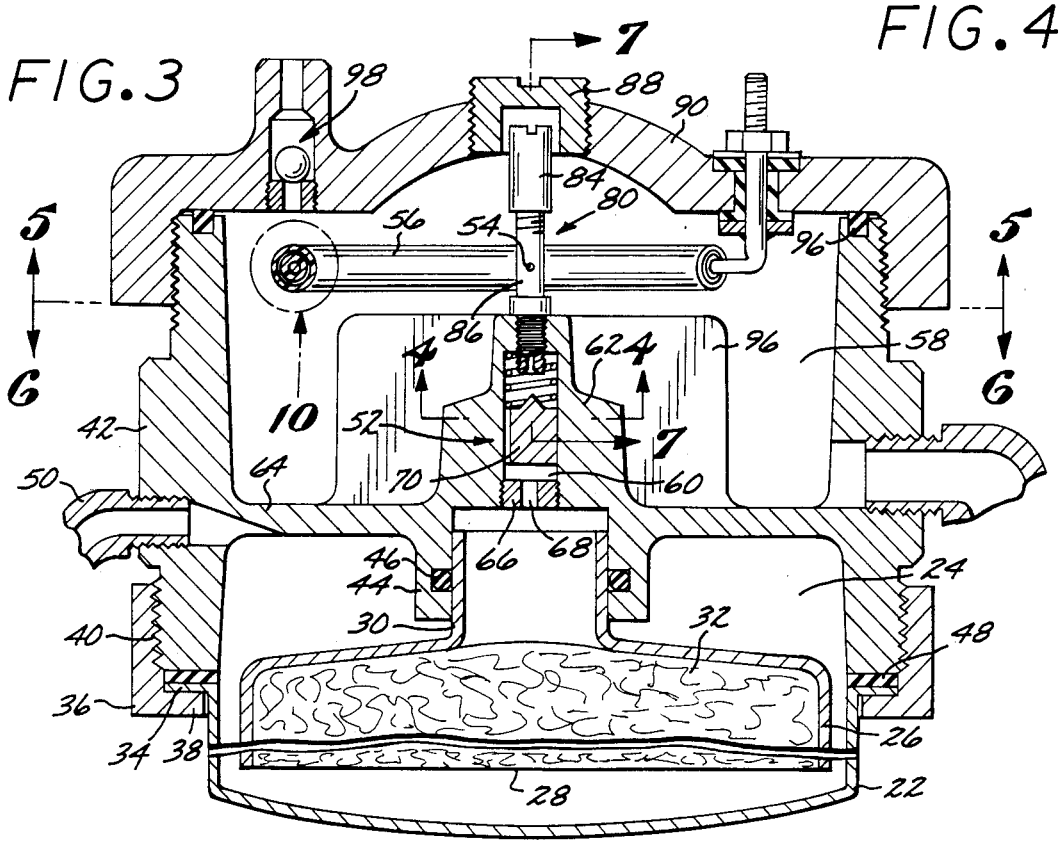
FIG. 3 is a cross-sectional view of the improved bypass oil refining device of the present invention, the cross-section being taken on lines 3,3 of FIG. 1.
Figure 5:
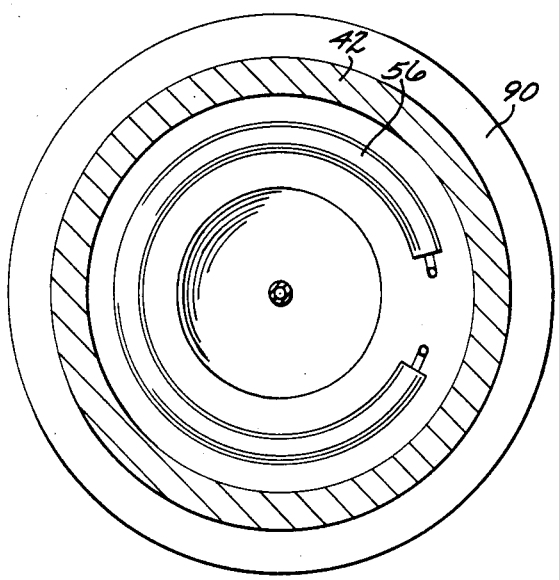
FIG. 5 is a cross-sectional view taken on lines 5,5 of FIG. 3.

FIG. 1 shows the improved bypass oil refining device 20 of the present invention in perspective, whereas FIG. 3 shows the same in cross-section. The improved bypass oil refining device 20 includes a generally cylindrical lower casing 22 which defines a lower cavity 24 wherein a disposable mechanical filter cartridge 26 is placed. The filter cartridge 26 has a grated bottom 28, a narrow neck portion 30, and contains cotton waste 32 and excelsior (or like material) generally used in conventional mechanical oil filters.

The lower casing 22 includes an outwardly directed flange 34 which engages an internally threaded fastening ring 36 having an inwardly directed flange 38. Internal threads 40 of the fastening ring 36 engage an upper casing 42. The upper casing 42 has a centrally positioned downwardly directed tubular portion 44 which engages, with the assistance of an O ring 46, the narrow neck portion 30 of the filter cartridge 26. A flat rubber gasket 48 is disposed between mating surfaces of the lower casing 22 and upper casing 42.

An inlet tube 50 is threadedly fitted into the side of the upper casing 42 and has an opening directed towards the lower cavity 24 in the lower casing 22. In other words, and as is clearly discernible on FIG. 3, during operation of the improved bypass oil refining device, oil enters into the lower cavity 24 through the inlet tube 50 and thereafter flows downwardly to enter into the filter cartridge 26 through its grated bottom 28. Mechanically filtered oil then exits from the filter cartridge 26 through the neck 30 of the cartridge 26.

Figure 9:
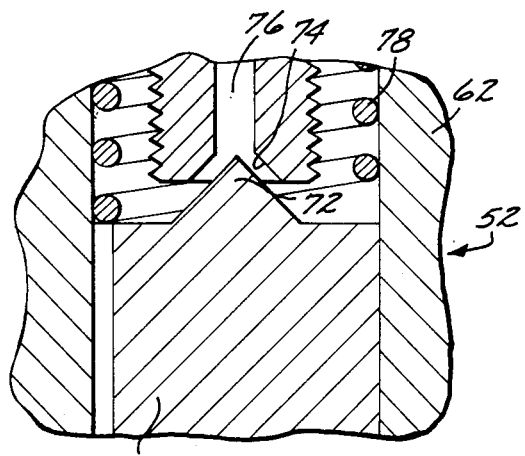
FIG. 9 is an enlarged cross-sectional view of the pressure control valve of the improved bypass oil refining device of the present invention.

As an important feature of the present invention, a pressure control valve system 52 is incorporated in the flow path of the mechanically filtered oil from the filter cartridge 26 to a plurality of holes 54 acting as nozzles and squirting oil toward a heating element 56 disposed in an upper cavity 58 of the improved bypass oil refining device. The pressure control valve system 52, which is shown enlarged in-part, on FIG. 9, is incorporated in an axially disposed, substantially cylindrical cavity 60 formed in a central protrusion 62 of a base or bottom plate 64 of the upper casing 42.

Figure 4:
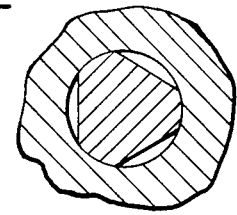
FIG. 4 is a partial cross-sectional view of the pressure control valve system of the improved bypass oil refining device of the present invention, the cross-section being taken on lines 4,4 of FIG. 3.

Thus, the pressure control valve system 52 includes a threaded plug 66 having a central hole 68 and a valve body 70 which has a substantially conical end 72. Sides of the valve body 70 are formed substantially flat, as is shown on FIG. 4, whereby the oil flows by the valve body 70. A valve seat 74 complementary in configuration to the conical valve end 72, and having a central conduit 76 is disposed above the valve body 70. The valve body 70 is biased away from the valve seat 74 by a coil spring 78. In the position shown on FIGS. 3 and 9, oil flows readily by the valve body 70 and through the central conduit 76 of the valve seat 74. However, when the pressure force of the oil on the valve body 70 exceeds the sum of the biasing spring 78 force and the weight of the valve body 70, then the valve body 70 is pressed towards the valve seat 74 so that the flow of oil through the central conduit 76 is closed. The predetermined threshold shut-off pressure, of course, depends on the weight of the valve body 70 and on the characteristics of the spring 78. In a typical application in connection with engines of passenger automobiles, the threshold shut-off pressure may be set at approximately 45 psi of oil pressure the improved bypass oil refining device.

In alternative embodiments of the improved bypass oil refining device of the present invention, the pressure control valve system 52 may be regulated by the weight of the valve body 70 only, so that a biasing spring is not needed or used. Still other shut-off valve systems to close off flow of oil through the improved bypass oil refining device of the present invention may become readily apparent to those skilled in the art in light of the present disclosure.

Figure 7:
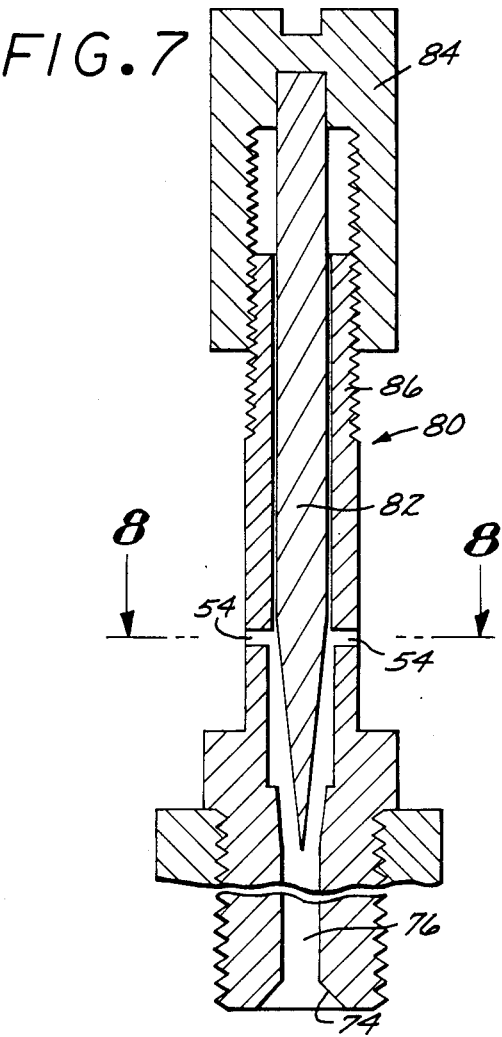
FIG. 7 is a cross-sectional view taken on lines 7,7 of FIG. 3.

In accordance with another feature of the present invention a flow rate regulating valve system 80 is disposed in the upper cavity 58, upstream of the pressure control valve system 52. The flow rate regulating system 80, best shown on FIGS. 3 and 7, comprises a needle valve body 82 carried by a cap 84 which is threadedly mounted to be adjustable on a valve shank 86. The needle valve body 82 enters into the central conduit 76 which passes through the valve seat 74 and through which the oil flows from the pressure control valve system 52 towards the heating element 56. The four holes 54, which act as nozzles, discharge oil substantially radially from the valve shank 86 directly towards the heating element 56. As is well shown on FIGS. 3 and 7, in the herein-described preferred embodiment, the position of the single needle valve body 82 regulates the flow rate of oil through all four holes 54. The holes 54 are disposed substantially level with the heating element 56. In alternative embodiments, a greater or lesser number of holes may be used as nozzles.

A removable threaded plug 88 is located in the upper dome-shaped closing member 90 of the upper casing 42. When the plug 88 is removed, a mechanic (not shown) may adjust, by a screwdriver (not shown) or the like, the position of the needle valve body 82, and thereby the flow rate of oil through the improved bypass oil refining device. In this connection it is contemplated that such adjustment of the flow rate is performed by a competent mechanic (not shown) when the improved bypass oil refining device is installed in a vehicle or boat having an internal combustion engine. The internal combustion engine 92 is only schematically shown on FIG. 2. A gauge 93 suitable for measuring flow rate is schematically indicated on FIG. 2.

Referring again principally to the cross-sectional view of FIG. 3, the dome-shaped closing member 90 of the upper casing 42 is shown threadedly affixed to the upper casing 42. The upper casing includes the base plate 64. A gasket 96 seals the closing member 90 and the upper casing 42 relative to one another. The electrical heating element 56 is mounted to the closing member 90, as is best shown on FIG.3.

Figures 8, 10:
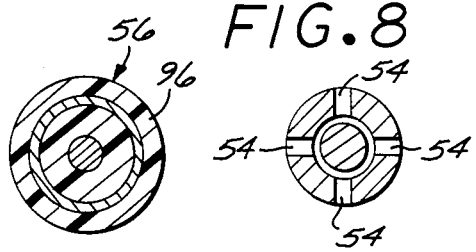
FIG. 8 is a cross-sectional view taken on lines 8,8 of FIG. 7.
FIG. 10 is an enlarged cross-sectional view of the heating element of the improved bypass oil refining device of the present invention.

The heating element 56 is preferably powered by the battery (not shown) of the vehicle (not shown), boat (not shown), or the like to which the improved bypass oil refining device of the present invention is mounted as an accessory. In many respects, the heating element 56 is conventional. However, as an important novel feature, it has an external coating 96 which serves to minimize the deposit of carbon or carbonaceous material on the heating element 56. A highly suitable material for such coating 96 is polytetrafluoroethylene (TEFLON), and the coating 96 is shown in exaggerated thickness on the cross-sectional view of FIG. 10. The polytetrafluoroethylene coating 96 may be deposited on the metal heating element 56 in accordance with techniques which are well known in the art and need not be described here in detail. As it was mentioned briefly in the introductory section of the present application for patent, deposit of carbon (not shown) or carbonaceous material (not shown) on the heating element 56 is highly undesirable because it interferes with the transfer of heat from the heating element 56 to the oil. As is known, rapid transfer of heat is very important for the proper operation of the improved bypass oil refining device. For proper operation of the bypass oil refining device, the heating element is usually heated to approximately 212° F. to 225° F.

Figure 6:
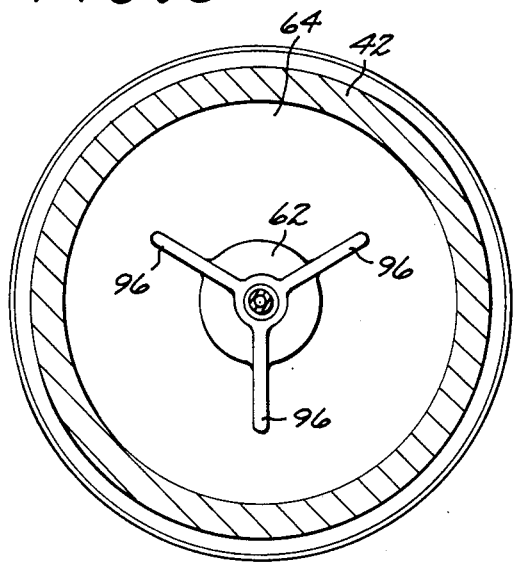
FIG. 6 is a cross-sectional view taken on lines 6,6 of FIG. 3.

Referring now principally to FIGS. 3 and 6, a plurality of surge baffling vanes or baffle plates 96 are shown disposed radially on the bottom or base plate 64 of the upper casing 42. The function of the baffle plates 96 is to minimize surging and splashing of liquid oil in the upper cavity 58, and thereby keeping liquid oil from temporarily covering the holes 54. As it will be readily understood with reference to the drawing Figures, in the improved bypass oil refining device of the present invention oil is ejected in relatively thin streams from the holes 54 directly towards the heating element 56. It is undesirable for the holes 54 to be even temporarily covered by oil, because in such a situation the ejected oil is unlikely to rapidly come into contact with the heating element 56. The surge and splash dampening baffle plates 96 are present to minimize the occurrence of such situations.

Referring still principally to the cross-sectional view of FIG. 3, a vapor release valve and vent 98 are shown. The purpose of the vapor release valve and vent 98 is to release, from the upper cavity 58, the water and fuel vapors which are distilled out of the oil by action of the heating element 56. The upper cavity 58, where the oil is heated to sufficiently high temperature to distill water and fuel vapors out of the oil, is also called a vaporization chamber.

Figure 2:
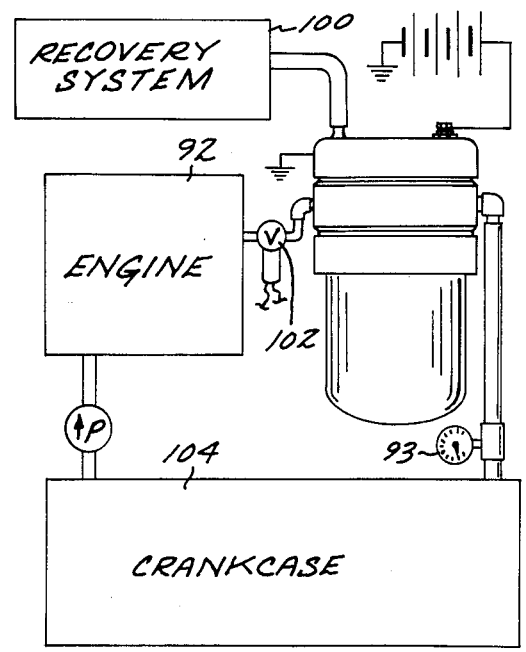
FIG. 2 is a schematic drawing showing the operative positioning of the improved bypass oil refining device of the present invention relative to the crankcase and engine of an automobile or truck.

Referring now principally to the schematic view of FIG. 2, an absorbent material disposed in a suitable container is fluidly attached to the vapor release valve and vent 98. The container and liquid absorbent material therein are jointly and schematically labelled "recovery system" 100 on FIG. 2. Preferably the recovery system 100 includes a disposable cartridge (not shown) containing such absorbent material as cotton fiber (not shown) or the like, which readily absorbs the condensed water and fuel vapors distilled out of the engine oil by the bypass oil refining device 20.

As a still additional feature of the present invention, a solenoid type electrically actuable flow shut-off valve 102 may be placed upstream of the inlet tube 50, whereby the flow of oil into the oil refining device 20 of the present invention may be shut off at the option of an operator (not shown).

The schematic view of FIG. 2 indicates the overall positioning of the bypass oil refining device 20 of the present invention relative to the internal combustion engine 92 of a vehicle (not shown). Thus, the bypass oil refining device 20 receives oil from a point in the engine's oil system where the oil pressure is relatively high. Oil flows back from the bypass oil refining device 20 into the crankcase 104 usually under the force of gravity only. Under some circumstances it may be desirable, or even necessary, to install an additional oil pump (not shown) to insure proper flow of oil through the bypass refining device 20.

The several advantages of the bypass oil refining device 20 of the present invention over the prior art should be readily apparent from the foregoing description. In summary, mechanically filtered oil is ejected directly towards the heating element 56 from the several oil ejection holes or nozzles 54. The baffle plates 96 located in the vaporization chamber 58 prevent slushing of the oil and insure that oil is ejected from the nozzles directly towards the heating element 56 even when the vehicle (not shown) is travelling on a rough road. Due to its polytetrafluoroethylene (or like) coating 96, the heating element 56 remains substantially free of deposit of carbon or carbonaceous material. By the use of the flow rate regulating valve system 80 the rate of oil flow is readily adjusted to be within a desired range. In this regard it is noted that for passenger automobiles the desired range is approximately 5 to 6 gallons per hour. The pressure control valve system 52 prevents build-up of excessive pressure and oil level in the vaporization chamber 58, and thereby prevents loss of engine oil into the environment. The recovery system 100 substantially eliminates escape of noxious fuel vapors from the bypass oil refining device 20 into the environment.

Several further advantages and modifications of the present invention may become readily apparent to those skilled in the art in light of the present disclosure. Therefore, the scope of the present invention should be interpreted solely from the following claims.

What is claimed is:

1. In a bypass oil refining device for an internal combustion engine, having inlet means for receiving lubricating oil flowing into the refining device from the engine, mechanical filter means for filtering the oil passing through the device, a vaporization chamber, nozzle means for establishing fluid communication between the filter means and the vaporization chamber whereby oil enters the vaporization chamber from the filter means in one or more thin streams, an electric heating element disposed in the vaporization chamber for rapidly heating the oil in said chambers to a high temperature so as to distill out as vapors a significant quantity of volatile fuel and water from the oil, outlet valve means for releasing the volatile vapors from the vaporization chamber, and outflow means in fluid communication with the vaporization chamber for returning oil from the vaporization chamber to the engine, the improvements comprising:

adjustable flow control means operatively associated with the nozzle means for controlling the rate of flow of the oil from the filter means through the nozzle means into the vaporization chamber; and a plurality of nozzles included in the nozzle means, which nozzles terminate in openings which direct flow of oil towards the heating element, and wherein the flow control means control the flow of oil through each of the nozzles.

2. A bypass oil refining device for an internal combustion engine, comprising:

inlet means for receiving lubricating oil flowing into the refining device from the engine;

mechanical filter means downstream of the inlet means for filtering the oil passing through the device;

a vaporization chamber disposed above the mechanical filter means and having a bottom plate forming a boundary to separate the chamber from the filter means, the vaporization chamber including a plurality of baffle plates;

nozzle means for establishing fluid communication between the filter means and the vaporization chamber whereby oil enters in one or more thin streams the vaporization chamber from the filter means;

pressure control means operatively associated with the nozzle means for shutting off flow of oil through the nozzle means when the oil pressure in the filter means exceeds a predetermined value;

adjustable flow control means operatively associated with the nozzle means to control the flow rate of the oil through the nozzle means;

an electric heating element disposed in the vaporization chamber for rapidly heating the oil in said chamber to a high temperature so as to distill out as vapors a significant quantity of volatile fuel and water from the oil, the heating element having an external coat which comprises means for substantially preventing the deposit of carbonaceous material on the heating element;

outlet valve means for releasing the volatile vapors from the vaporization chamber, and outflow means in fluid communication with the vaporization chamber for returning oil from the vaporization chamber to the crankcase of the engine.

3. The bypass oil refining device of claim 2 further comprising means for absorbing condensates of the fuel vapors and water which is expelled through the outlet valve means, the means for absorbing being fluidly connected with the outlet valve means.

4. The bypass oil refining device of claim 2 wherein the external coat of the heating element comprises tetrafluoroethylene (TEFLON).

5. The bypass oil refining device of claim 2 wherein the adjustable flow control means comprise a needle valve.

6. The bypass oil refining device of claim 5 wherein the nozzle means includes a plurality of openings into the vaporization chamber, said openings directing flow of the oil towards the heating element, and wherein the needle valve controls flow of oil through each of the openings.

7. The bypass oil refining device of claim 5 wherein the nozzle means are located substantially above the center of the bottom plate.

8. The bypass oil refining device of claim 5 wherein the pressure control means comprise a substantially conical orifice disposed below the needle valve and a body having a conical protrusion substantially complementary to the conical orifice, the body being biased into a position wherein the conical protrusion allows passage of oil through the orifice, and wherein the bias of the body is overcome by the force of the oil pressure when the oil pressure exceeds the predetermined level.

9. The bypass oil refining device of claim 5 further comprising an electrically actuable shut-off valve fluidly connected to the inlet means to optionally shut off flow of oil from the engine to the inlet means.

* * * * *